Dec. 19, 1933.   R. F. KOHR   1,940,456
FLEXIBLE CONDUIT
Filed Nov. 24, 1930   2 Sheets-Sheet 1

INVENTOR.
ROBERT F. KOHR
BY
M. W. McConkey
ATTORNEY

Dec. 19, 1933.    R. F. KOHR    1,940,456
FLEXIBLE CONDUIT
Filed Nov. 24, 1930    2 Sheets-Sheet 2

INVENTOR.
ROBERT F. KOHR
BY
M. W. McConkey
ATTORNEY

Patented Dec. 19, 1933

1,940,456

UNITED STATES PATENT OFFICE 1,940,456

FLEXIBLE CONDUIT

Robert F. Kohr, South Bend, Ind., assignor to Bendix Brake Company, South Bend, Ind., a corporation of Illinois Application November 24, 1930
Serial No. 497,714

1 Claim. (Cl. 188—205)

This invention relates to brakes and more particularly to operating cables therefor.

Heretofore, brakes operated through cables have proved generally satisfactory. However, the operating cables are usually enclosed in flexible metallic conduits having smoothly fitting flexible metallic covers. These conduits with their associated covers are generally secured to brackets or abutments on the backing plates of the brakes. Due to localizing the stresses in the conduits at their connections with the abutments caused by the whipping action of the conduits and associated cables when operating the vehicle over rough or uneven surfaces, the conduits crystallize at their connections and break apart. It is the aim of the present invention to overcome this difficulty.

An object of the invention is to provide means for absorbing stresses and strains imposed on flexible conduits due to the whipping action thereof.

Another object of the invention is to provide means for eliminating breakage of conduits at their connections.

Another object of the invention is to provide a resilient connection between a flexible conduit and a fixed support or abutment.

Another object of the invention is to provide means for attaching a flexible conduit to a fixed abutment so that the whipping action of the conduit, due to vibration, may be effectively absorbed.

A feature of the invention is a spring wound on a conduit having one of its ends secured to the support for the conduit.

A further feature of the invention is a spring wound between the convolutes of a conduit with one end secured together with the conduit to a fixed support or abutment.

Yet a further feature of the invention is a spring wound on a conduit having convolutes of progressively increasing pitch and a common securing means for the conduit and spring.

Other objects of the invention will appear from the following description taken in connection with the drawings which form a part of this specification, and in which.

Figure 1:
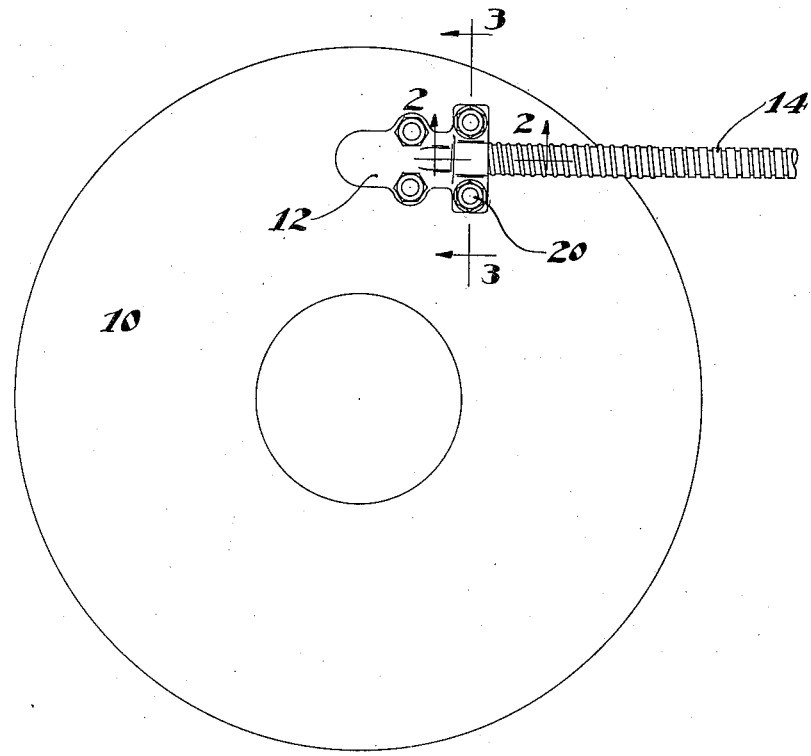
Figure 1 is a side elevation of a backing plate with the invention applied.
Figures 2, 3:
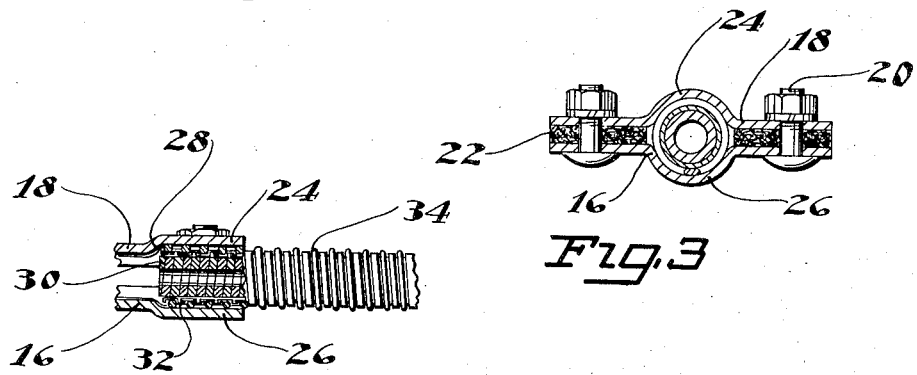
Figure 2 is a section substantially on line 2—2, Figure 1.
Figure 3 is a section substantially on line 3—3, Figure 1.

Referring to the drawings for more specific details of the invention, 10 represents a backing plate of any preferred type. Positioned on the backing plate is a bracket or an abutment 12 adaptable for the attachment of a conduit 14. As shown, the abutment 12 is formed in two parts 16 and 18 secured together as by bolts 20 with a suitable felt washer 22 interposed.

The parts 16 and 18 have enlarged semi-cylindrical portions 24 and 26 which register to provide a socket having a shoulder 28. As shown, a conduit 30 having a cover 32 is adapted to fit into the socket and to engage the shoulder 28. A spring 34 is wound on the cover of the conduit between the convolutes of the cover with one of its ends interposed between the cover and the semi-cylindrical portions on the members 16 and 18.

Figure 4:
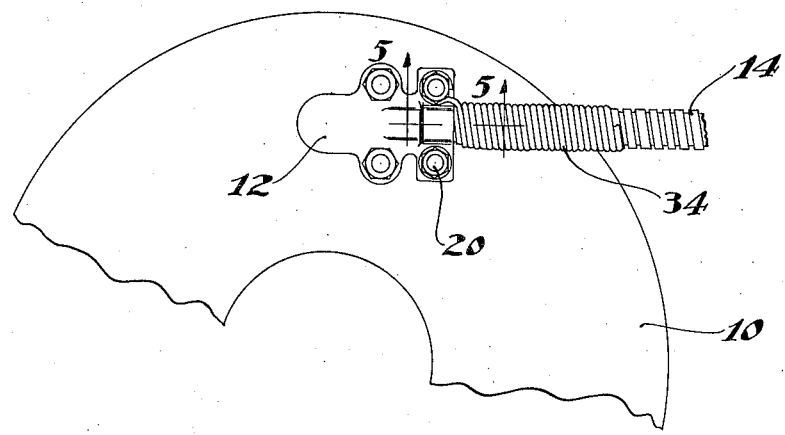
Figure 4 is a side elevation of a portion of a backing plate illustrating a modified form of the invention as applied.
Figure 5:
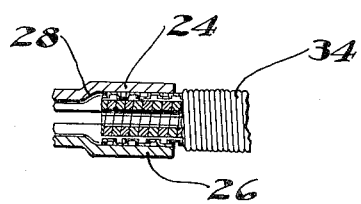
Figure 5 is a section substantially on line 5—5, Figure 4.

A modification of the invention is illustrated in Figures 4 and 5. In this modification, the spring 34 is wound closely on the cover of the conduit immediately adjacent the abutment 12 and one end of the spring is secured beneath a nut on one of the bolts 20, in which instance, the usual lock washer may be eliminated.

Figure 6:
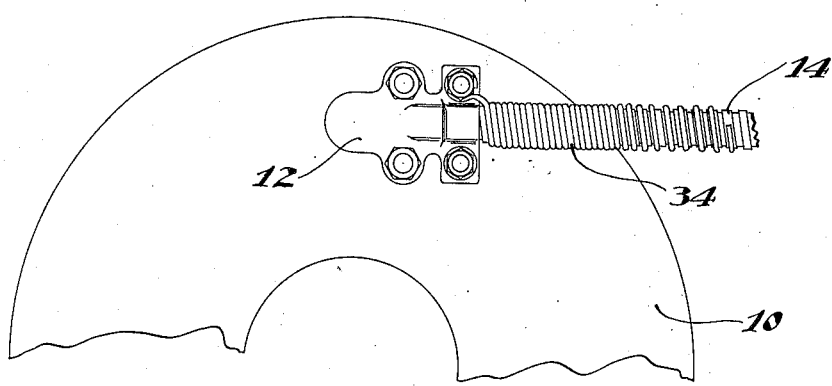
Figure 6 illustrates a further modification of the invention.

A further modification of the invention is illustrated in Figure 6 wherein the spring 34 is so wound upon the conduit, or the cover of the conduit, as the case may be, to gradually stiffen the conduit toward the end secured in the bracket or abutment. In other words, the convolutions of the spring progressively increase in pitch from a point immediately adjacent the abutment outwardly therefrom.

In both the preferred form and in the modification, fatigue of the conduit at its connection to the bracket or fixed support, by reason of localizing the stresses therein due to the whipping action of the conduit occasioned by operating a vehicle over rough and uneven surfaces is avoided.

Although this invention has been described in connection with certain specific embodiments, the principles involved are susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is:

In a motor vehicle brake, a backing plate, a bracket on the backing plate, a conduit formed with a convolute casing, means for clamping the conduit to the backing plate and a spring mounted on the conduit between the convolutes thereof and having one end secured by the clamping means.

ROBERT F. KOHR.